Figure 2:
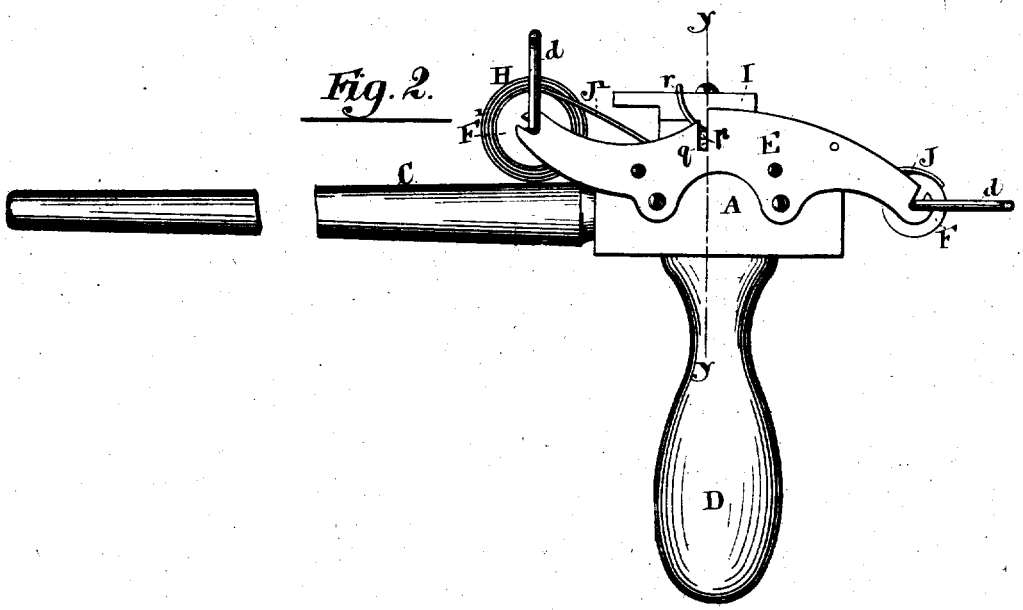

2 Sheets—Sheet 1.

M. J. MATTHEWS, dec'd,

J. MATTHEWS & J. MORGAN, executors, assignor of two-thirds interest to J. MORGAN & J. NICHOL.

MECHANICAL MUSICAL INSTRUMENT.

No. 9,861. Reissued Sept. 6, 1881.

Witnesses:—
Louis M. Whitehead
Geo. Haynes

Inventor:
Mason J. Matthews
by his Attorneys
Brown & Brown

2 Sheets—Sheet 2.
M. J. MATTHEWS, dec'd,
J. MATTHEWS & J. MORGAN, executors, assignor of two-thirds interest to J. MORGAN & J. NICHOL.
MECHANICAL MUSICAL INSTRUMENT.
No. 9,861. Reissued Sept. 6, 1881.
Fig. 3.
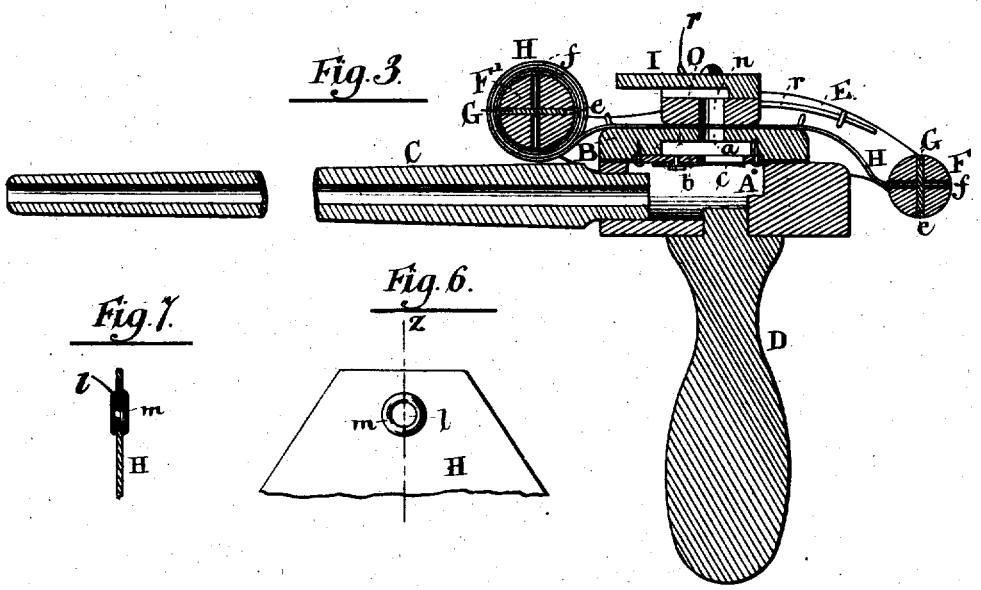
Fig. 7.
Fig. 6.
Fig. 4.
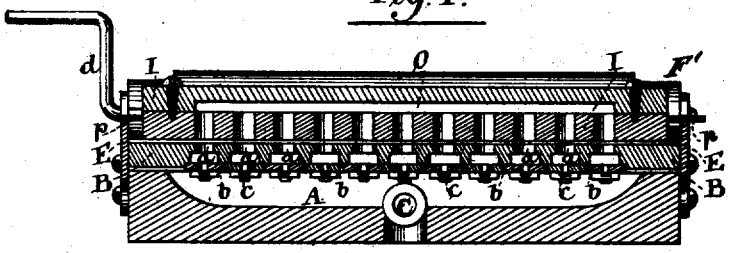
Fig. 5.
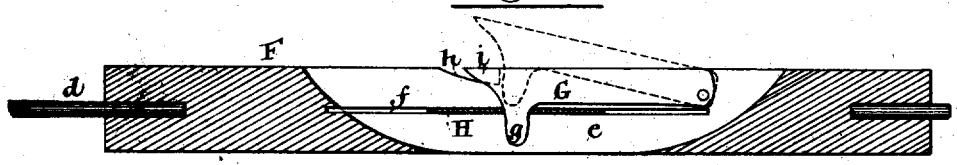
Witnesses:-
Louis M. Whitehead.
Geo. Hayes
Inventor:-
Moses J. Matthews
by his Attorneys
Brown & Brown.

UNITED STATES PATENT OFFICE.

MASON J. MATTHEWS, (JANE MATTHEWS AND JAMES MORGAN, EXECUTORS OF MASON J. MATTHEWS, DECEASED,) OF NEW YORK, ASSIGNOR OF TWO-THIRDS INTEREST TO JAMES MORGAN, OF BROOKLYN, AND JOHN NICHOL, OF NEW YORK. N. Y.

MECHANICAL MUSICAL INSTRUMENT.

SPECIFICATION forming part of Reissued Letters Patent No. 9,861, dated September 6, 1881.

Original No. 211,634, dated January 28, 1879. Application for reissue filed August 5, 1880.

*To all whom it may concern:*

Be it known that I, MASON J. MATTHEWS, formerly of Boston, in the county of Suffolk and State of Massachusetts, and later of the city and county of New York, in the State of New York, have invented certain new and useful Improvements in Mechanical Musical Instruments, of which the following is a specification.

The invention relates to that class of musical instruments in which a music-sheet of paper or other thin flexible material is used to control the passage of air for operating sound-producing devices.

The invention consists in the combination, with a mechanical musical instrument having a music-sheet for controlling the operation of the sound-producing devices, of a music-roller and a take-up roller for the music-sheet external to and arranged at opposite sides of its body or case.

It also consists in the combination, with a mechanical musical instrument having a music-sheet for controlling the operation of its sound-producing devices, of a take-up roller for the music-sheet supported in bearings secured to the body or case of the instrument and extending beyond the end of the same.

It also consists in the combination, with a mechanical musical instrument having a music-sheet for controlling the operation of its sound-producing devices, of a music-roller and a take-up roller for the music-sheet supported in bearings secured to the body or case of the instrument and extending beyond the ends of the same.

It also consists in the combination, in a mechanical musical instrument, with a wind-chest, a reed box or chest provided with a series of reeds, each tuned to a different pitch, and a perforated music strip or sheet, of bars or plates secured one to each end of the wind-chest, reed-chest, or wind-chest and reed-chest, and adapted to support at either end a paper roll or roller for the music-sheet.

It also consists in the combination, in a mechanical musical instrument, of a wind-chest, a reed-chest provided with a series of reeds, bars or plates extending therefrom, rolls or rollers supported thereby, a perforated music-sheet connected at each end to one of said rollers, and spring-brakes for said rollers.

It also consists in the combination, in a mechanical musical instrument, of sound-producing devices, a music-sheet for controlling their operation, a rest for the music-sheet, and a presser holding the music-sheet to the rest and provided with apertures affording provision for the passage of air between the bottom and side of the presser.

It also consists in the combination, in a mechanical musical instrument, of a wind-chest, a reed box or chest provided with a series of reeds, a music strip or sheet of perforated paper or other flexible material, and two rolls or rollers, each provided with a crank and with means for readily attaching one end of said music-sheet thereto.

It also consists in a roller for a music-sheet having formed therein two longitudinal slits through, or nearly through, the same, at right angles, or nearly so, to each other, and having pivoted in one of the slits a lever provided with an angular projection for engaging with an opening in the music-sheet.

It also consists in two rollers for a traveling music-sheet, having two longitudinal slits extending through, or nearly through, the same, at, or nearly at, right angles to each other, and having pivoted in one of the slits a lever provided with an angular projection.

It also consists in two rollers for a traveling music-sheet, each provided with a crank and having formed therein two longitudinal slits, one being provided with a pivoted lever-hook, in combination with a wind-chest, suitable means of supplying wind thereto, a reed-box provided with a series of reeds, and a traveling music-sheet having re-enforced openings at the ends.

It also consists in the combination, with a music-sheet and a roller therefor, of a lever pivoted to the latter and capable of being swung into a position approximately parallel with the roller to secure the music-sheet thereto.

It also consists in the combination, with a mechanical musical instrument and its perforated music-sheet, of a set of rollers arranged and adapted to wind said sheet in either direction, as desired.

Figure 1:
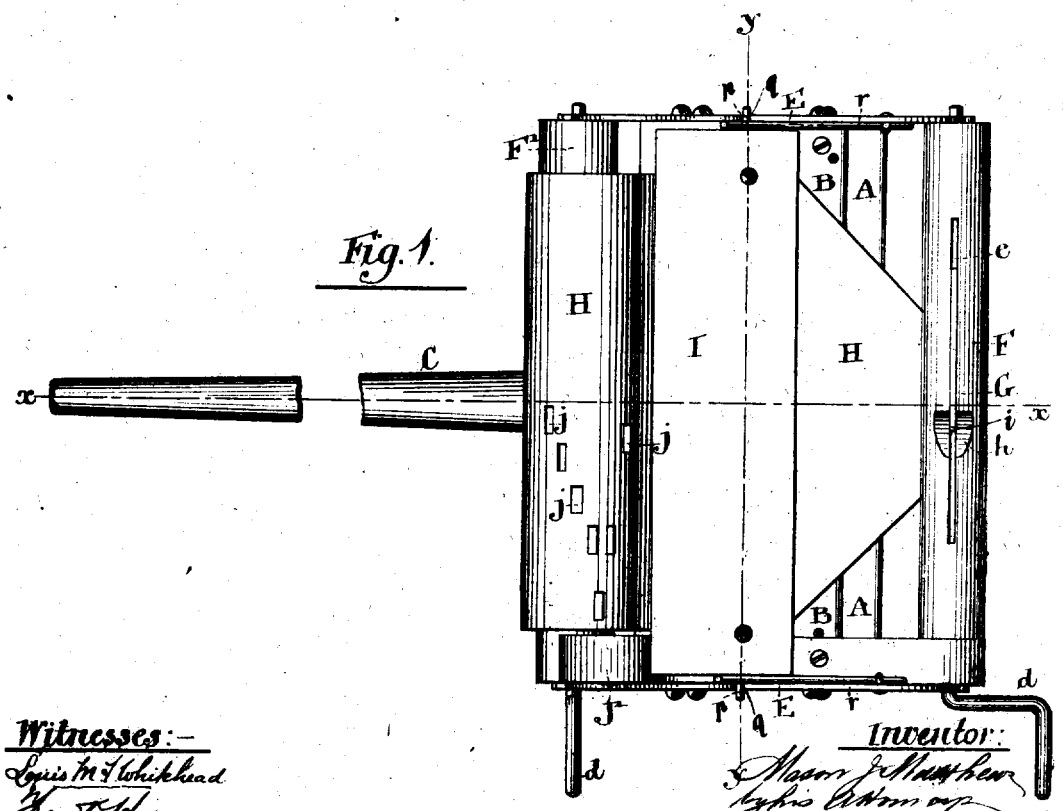

In the accompanying drawings, Figure 1 is a plan of an instrument adapted to be supplied with wind from the lungs of the operator, and embodying the invention. Fig. 2 is a side elevation. Fig. 3 is a vertical section on line *x x* on Fig. 1. Fig. 4 is a vertical section on line *y y* on Figs. 1 and 2. Fig. 5 is a central longitudinal section of one of the paper-carrying rolls. Fig. 6 is a plan of a portion of one end of the paper strip, showing the re-enforced opening for securing it to the roll; and Fig. 7 is a section of the same on line *z z* on Fig. 6.

A is the wind-chest, having secured upon its upper side the reed box or chest B, having formed therein a series of wind-passages, *a a*, directly beneath each of which is secured to the under side of the reed-box B a reed-frame, *b*, each provided with a reed, *c*, tuned to a different pitch from the others.

C is a pipe, through which wind is supplied to the wind-chest from the lungs of the operator; and D is a handle, by which the instrument is held in the left hand of the operator.

E E are two thin metal bars or plates, secured, as here shown, one to each end of the wind-chest A and reed box or chest B, and each extending beyond the front and rear edges thereof, and having mounted in suitable bearings formed therein the paper-carrying rolls, rollers, or cylinders F and F′, which may be termed respectively "take-up" and "music" roll or rollers, as shown in Figs. 1 and 2. Each of the rolls F and F′ is provided with a crank, *d*, by which it may be revolved, and also has formed therein, near the middle of its length, two longitudinal slits, *e* and *f*, extending through, or nearly through, said roll at right angles, or nearly so, to each other. In the slit *e* is pivoted the lever or arm G, provided at its movable end with the projection *g*, and constituting what may be termed a "lever-hook," as shown in Fig. 5. The rolls F and F′ each have a notch, *h*, cut in one side of its periphery, to enable the operator to place his thumb or finger nail, or any suitable tool, under the pointed end *i* of the lever G, to raise it when it is desired to remove the strip of perforated paper from the instrument. The rollers F F′ may be said to constitute a set of rollers for winding the music-sheet in either direction, as may be desired.

H is a music strip or sheet of paper, or other flexible material, having formed therein a series of perforations, *j j*, arranged in regular order to represent the various notes of a tune, and of varying lengths, according to the length of tone it is desired to produce. The extreme ends of the strip or sheet of paper, or other thin flexible material, H, are reduced in width by cutting off the corners, as shown in Figs. 1 and 6, and each of said ends has formed therein a single perforation, *l*, the material around said perforation being re-enforced or strengthened by inserting therein a metallic eyelet, *m*, as shown in Figs. 6 and 7. The end of the strip of paper is inserted in the slit *f* of the roll F or F′, when the lever G is in the position indicated in the dotted lines in Fig. 5, till the eyeleted hole *l* is directly under the projection *g*, when the lever G is pressed down into the position shown in full lines in Fig. 5, with the pin *g* passing through the hole *l*.

I is a pressure-bar or presser, provided with a series of wind passages or apertures, *n*, corresponding to those in the reed box or chest B, and opening into the longitudinal slit or aperture *o*, and also provided at each end with a journal-pin, *p*, which has a bearing in the slot *q*, formed in the upper edge of the bar or plate E. These apertures afford provision for the passage of air between the bottom and side of the presser. The paper H rests upon the upper surface of the reed box or chest B, which forms a rest for it, and the pressure-bar I rests upon the paper, and is pressed with considerable force downward to hold the paper closely upon the reed box or chest by the tension of the springs *r r*, which are attached to the inner sides of the bars or plates E E, and press at their movable ends upon the journal-pins *p* of the bar I.

J and J′ are spring-brakes, bearing at their movable ends upon the rolls F and F′, respectively, to prevent the elasticity of the coil of paper, when wound onto either of said rolls, from turning said roll backward and partially unwinding the paper therefrom.

The operation of the improved instrument is as follows: The parts being in the positions shown in Figs. 1, 2, and 3, with the bulk of the paper H wound upon the roll F′, the operator takes the instrument by the handle D in his left hand, places the end of the pipe C in his mouth, and blows into said pipe, and at the same time turns the crank *d* of the roll F so as to draw the paper H off from the roll F′ and wind it onto the roll F, during which movement of the paper the perforations *j j* are each brought successively over a reed, and wind is permitted to pass through the wind-passages and cause the reed to vibrate, and thus produce the desired tone.

When the paper has all been wound onto the roll F, if it is desired to repeat the same tune the paper is rewound onto the roll F′ without supplying the wind-chest and reeds with wind, when the operation may be repeated. If, however, it is desired to change the tune, the pressure-bar I is removed, the end of the paper is detached from the roll F, and it is then unwound and detached from the roll F′. Another strip is then connected at each end to one of the rolls F and F′ and wound upon the roll F′, when the pressure-bar I is again placed in position, and the instrument is again ready for use.

What is claimed as the invention, and desired to be secured by Letters Patent, is—

1. The combination, with a mechanical musical instrument having a music-sheet for controlling the operation of its sound-producing devices, of a music-roller and a take-up roller for the music-sheet external to and arranged at opposite sides of the body or case, substantially as specified.

2. The combination, with a mechanical musical instrument having a music-sheet for controlling the operation of its sound-producing devices, of a take-up roller for the music-sheet, supported in bearings secured to the body or case of the instrument and extending beyond the end of the same, substantially as specified.

3. The combination, with a mechanical musical instrument having a music-sheet for controlling the operation of its sound-producing devices, of a take-up music-roller and a take-up roller for the music-sheet, supported in bearings secured to the body or case of the instrument and extending beyond the ends of the same, substantially as specified.

4. In combination with a wind-chest, a reed-box provided with a series of reeds, each tuned to a different pitch, and a strip or sheet of paper or other thin flexible material having formed therein a series of perforations arranged to represent the various notes of a tune, the bars or plates E, secured one to each end of the wind-chest, reed-box, or wind-chest and reed-box, and adapted to support a paper-carrying roll at either end thereof, substantially as specified.

5. The combination of the wind-chest A, reed-box B, provided with a series of reeds, the bars or plates E E, rolls F and F′, a strip or sheet of perforated paper, H, connected at each end to one of said rolls, and the spring-brakes J and J′, all arranged and adapted to operate substantially as and for the purposes described.

6. In a mechanical musical instrument, the combination of sound-producing devices, a music-sheet for controlling their operation, a rest for the music-sheet, and a presser holding the music-sheet to the rest, and provided with apertures, arranged substantially as described and shown, to afford provision for the passage of air between the bottom and side of the presser.

7. A strip or sheet of paper or other thin flexible material having formed therein a series of perforations arranged in the proper order to represent the various notes of a tune, and also having formed in each end thereof a single perforation, the edge of which is re-enforced or strengthened, as set forth, as a means, in combination with a pin, of securing said strip or sheet of flexible material to the feed or carrying rolls, substantially as described.

8. The combination of the wind-chest A, reed-box B, provided with a series of reeds, a strip or sheet of perforated paper or other flexible material, H, and the two rolls or cylinders F and F′, each provided with a crank, *d*, and with means for readily attaching one end of said strip or sheet of paper or other flexible material thereto, all arranged and adapted to operate substantially as and for the purposes described.

9. The roll F or F′, having formed therein the two longitudinal slits *e* and *f*, extending through, or nearly through, the same at right angles, or nearly so, to each other, and having pivoted in one of said slits the lever G, provided with the angular projection *g*, substantially as described.

10. The two rolls F and F′, each provided with a crank, and having formed therein the two longitudinal slits *e* and *f*, in one of which is pivoted the lever-hook G *g*, in combination with a wind-chest, suitable means of supplying wind thereto, a reed-box provided with a series of reeds, and a strip or sheet of paper or other thin flexible material having formed therein a series of perforations, *j j*, and two re-enforced openings, *l l*, all arranged and adapted to operate substantially as and for the purposes described.

11. The combination, with a music-sheet and a roller therefor, of a lever pivoted to the latter and capable of being swung into a position approximately parallel with the roller to secure the music-sheet thereto, substantially as specified.

12. The combination, with a mechanical musical instrument and its perforated music-sheet, of a set of rollers arranged and adapted to wind the music-sheet in either direction, as desired, substantially as specified.

MASON J. MATTHEWS.

Witnesses:

CHARLES H. HOLDEN,
M. A. MADDEN.